DATA STORAGE

Filed July 7, 1966 3 Sheets-Sheet 1

INVENTORS
Sigfrid Schweizerhof &
Siegfried Schäfer

BY Spencer & Kaye

ATTORNEYS

LEGEND

INDICATES LAYER HAVING STORAGE FUNCTION

INVENTORS
Sigfrid Schweizerhof &
Siegfried Schäfer
BY Spencer & Kaye
ATTORNEYS

DATA STORAGE

Filed July 7, 1966 3 Sheets-Sheet 3

INVENTORS
Sigfrid Schweizerhof &
Siegfried Schäfer

BY Spencer & Kaye
ATTORNEYS

United States Patent Office 3,483,538

Patented Dec. 9, 1969

3,483,538

DATA STORAGE

Sigfrid Schweizerhof, Backnang, and Siegfried Schafer, Stuttgart-Zuffenhausen, Germany, assignors to Telefunken Patentverwertungs G.m.b.H., Ulm (Danube), Germany Filed July 7, 1966, Ser. No. 563,413
Claims priority, application Germany, July 17, 1965, T 29,009
Int. Cl. G11b *5/00*
U.S. Cl. 340—174 9 Claims

ABSTRACT OF THE DISCLOSURE

An arrangement for storing information by controlling the magnetization of magnetic layers disposed in a regular array of information storage areas, the arrangement including two conductor circuits each having a respective conductor portion traversing each storage area, the conductor portions traversing each area extending perpendicular to one another, each storage area being constituted by a circular region substantially separated from the remainder of a support carrying the conductor circuits, each magnetic layer being constituted by a substantially closed, hollow shell of magnetic material enclosing its respective storage area and having a substantially circular cross section whereby the magnetization of each magnetic layer can be given any desired direction parallel to the plane of the support by an appropriate control of the currents flowing through its associated conductor portions.

The present invention relates to the field of data storage, and particularly to magnetic storage, switching and logic arrangements.

It is know that arrangements of this type are widely used in electric adding machines, electronic computers, electronic telephone exchanges, and similar devices. Most known arrangements or systems of this type are presently manufactured by individually wiring single magnetic storage, switching, or logic elements. Such methods are therefore relatively time consuming and expensive and become increasingly more so as a result of continuing attempts to further reduce the size of these elements and to increase their information handling and storage capacities.

For these reasons, attempts have been made for some time to develop integrated circuit techniques according to which the elements of such systems need no longer be manufactured and assembled individually but may be manufactured and assembled in a single operation.

The manufacturing processes of this type which have already been proposed have not fully solved this problem, either because they do not achieve a satisfactory degree of integration or because they present certain serious technological difficulties.

One such method, which is described in German Patent No. 1,125,971, employs a base plate made from insulating material in which apertures are formed to define a plurality of web portions. Each side of the plate is provided with one circuit whose conductor portions extend along these web portions. After the circuits have been covered with an insulating layer, magnetic cores are formed by galvanization or evaporation of a suitable magnetic material around each of the web portions.

Although this technique represents a substantial degree of integration, it still presents several practical difficulties. One of the most serious difficulties involves the fact that only two surfaces are available for the provision of conductor circuits so that in situations where more than two circuits are required per web portion for a particular logic element it is necessary to provide more than one circuit on one surface of the plate. Since this requires the placing of the portions of two circuits on the same web surface, the danger arises that the two circuits on the same side of the plate will not be sufficiently insulated from one another, or that the circuit portions will have to be so thin that the resulting circuits will have an undesirably high resistance, or that the width of each web portion will have to be increased, thereby increasing the amplitudes of the currents required for switching the magnetic storage elements. Furthermore, this technique involves the passage of at least one of the circuits from one side of the base plate to the other, it being readily appreciated that such a procedure is technologically difficult and has the undesirable effect of disturbing the generally regular cellular structure of the resulting system. While it is technically possible to alternatively print one circuit and to then apply additional circuits thereover, such procedures are generally complicated and uneconomical.

It is a primary object of the present invention to overcome these drawbacks and difficulties.

A more specific object of the present invention is to produce a novel magnetic data storage arrangement in a simple and inexpensive manner.

A still further object of the present invention is to produce integrated magnetic information storage arrangements having any desired number of circuits.

These and other objects are achieved according to the present invention by a method of making an arrangement for the storing, switching, or logic combination of informations through the use of thin magnetic layers capable of storage and electric functional circuits for controlling and monitoring the magnetic state of such layers in predetermined functional areas. This method primarily includes the steps of providing at least one sheet having a supporting layer of plastic material and a layer of electrically conductive material on at least one surface thereof and perforating each such sheet with a plurality of spaced apertures to form a plurality of sheet web portions each of which defines a respective functional area. The method further includes selectively etching away portions of each electrically conductive layer to form a respective functional circuit having conductive portions which are carried by at least some of the web portions, and electrically insulating each resulting functional circuit.

The present invention also involves an arrangement for the storing, switching, or logic combination of informations. This arrangement essentially includes at least one supporting layer of plastic material, at least one conductor circuit, insulating means electrically insulating each conductor circuit, and a thin magnetic information storage layer. In this arrangement, each supporting layer of plastic material has a plurality of apertures defining linear web portions which intersect at right angles to one another, these web portions defining a functional area for storing informations. The at least one conductor circuit is provided for controlling the information present at the functional areas and is disposed on one surface of the plastic layer and is formed of conductor portions carried by the web portions. Finally, the thin magnetic information storage layer is arranged to enclose at least each of the functional areas.

According to a specific form of construction, there are provided a plurality of stacked supporting layers having their respective web portions in alignment to form composite web portions, each layer having at least one conductor circuit disposed thereon and the information storage layer enclosing each composite web portion.

One of the principal advantages offered by the present invention is that a separate surface is available for each individual circuit, regardless of the number of circuits which are required for a particular device. As a result, a more dependable electrical insulation may be provided between adjacent circuits. Moreover, this arrangement eliminates the necessity for passing any one circuit from one surface to another.

Another important advantage of the present invention resides in the fact that all of the conductor portions associated with each web portion may be positioned relatively close together so as to permit the storage layer associated with each functional area to have an extremely short magnetic path length. As a result, a substantial reduction is obtained both in the current levels which must be employed and the space which will be occupied by the resulting device.

In addition, the fact that the present invention contemplates the use of commercially available copper-backed plastic sheets as the basic construction elements leads to a further simplification and cost reduction in the manufacturing process as compared with prior art methods in which the electric circuits must first be applied to a preformed, perforated insulating plate.

Additional objects and advantages of the present invention will become apparent upon consideration of the following description when taken in conjunction with the accompanying drawings in which:

FIGURE 1*a* is a top plan view of the upper surface of a first sheet employed in a first form of construction according to the present invention.

FIGURE 1*b* is a top plan view of the lower surface of the first sheet of FIGURE 1*a*.

FIGURE 1*c* is a top plan view of the upper surface of a second sheet to be combined with the sheet of FIGURES 1*a* and 1*b*.

FIGURE 1*d* is a top plan view of the lower surface of the sheet of FIGURE 1*c*.

FIGURE 1*e* is a top plan view of the lower surface of a third sheet to be combined with the sheets of FIGURES 1*a* to 1*d*.

FIGURE 2 is a partial, cross-sectional view of an assembled arrangement of the sheets of FIGURES 1*a* to 1*e*.

FIGURE 3*a* is a top plan view of one portion of another device constructed according to the present invention.

FIGURE 3*b* is a cross-sectional view taken along the plane defined by the line B—B of FIGURE 3*a*.

FIGURES 1*a* to 1*e* show the various component layers of a storage matrix constructed according to the present invention. This matrix is intended to employ half-select currents and has a capacity of 36 bits. The storage matrix illustrated may be in the form of a square and may be relatively small, with each edge having a length of 20 millimeters or less, for example.

A core matrix constructed according to the present invention is built up of a plurality of square sheets, there being three such sheets employed in the arrangement of FIGURE 1. Thus, FIGURE 1*a* shows the top surface of a first sheet, FIGURE 1*b* shows the bottom surface of this first sheet, FIGURE 1*c* shows the top surface of a second sheet, FIGURE 1*d* shows the bottom surface of this second sheet, and FIGURE 1*e* shows the bottom surface of the third sheet. In order to facilitate an understanding of the present invention, all of the views of FIGURE 1 are top plan views, i.e., they are all taken in the same direction perpendicular to the planes of the sheets.

Each of the sheets is originally composed of a polyester carrier layer 1 having a thickness of the order of $20\mu$ (microns) and two copper layers each having a thickness of the order of 20 to $35\mu$ and each disposed on a respective surface of polyester layer 1. Portions of each copper layer are selectively etched away, by means of photoetching techniques for example, to form the desired circuit arrangements shown in FIGURE 1.

Each sheet is then perforated with a plurality of square apertures 2 between which are disposed the web, or strip, portions 3 which serve as supports for the various conductors.

Figure 1A:
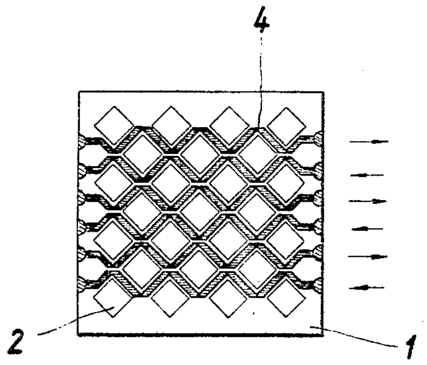
Figure 1B:
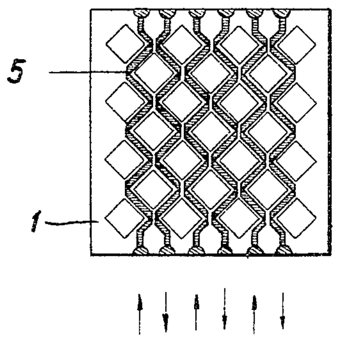

The sheet illustrated in FIGURES 1*a* and 1*b* is provided in this manner with a plurality of line conductors 4 (FIGURE 1*a*) on one side thereof and a plurality of column conductors 5 (FIGURE 1*b*) on the other side thereof, conductors 4 being separated from conductors 5 by the polyester sheet 1. Although the conductors 5 are on the other side of the sheet from conductors 1, the views of both FIGURES 1*a* and 1*b* are taken in the same direction in order to facilitate an understanding of the relation between the two series of conductors.

Although the line conductors 4 extend substantially at right angles to the column conductors 5, both sets of conductors follow a generally zig-zag path so that the conductor portions disposed on respective opposite sides of each web portion 3 extend substantially parallel to one another.

Each of the conductors 4 and 5 is intended to carry a half-select current flowing in the direction illustrated by the respective one of the arrows shown in FIGURES 1*a* and 1*b*. The directions of current flow are such that current will flow in the same direction through the conductor portions disposed on respective opposite sides of each web portion 3. Thus, the flow of current through one line conductor 4 and one column conductor 5 will have the effect of magnetizing a magnetic storage layer surrounding that web portion 3 traversed by both conductors since current will flow through both conductors in the same direction along this web portion. Thus, each web portion 3 is intended to define an information storage region, or functional area.

At each point where a plurality of the web portions 3 intersect, two line conductors 4 and two column conductors 5 will converge without coming into contact. Because of the direction of flow of currents through these conductors, the magnetic field effects produced by these currents will be substantially neutralized at these intersection points. Therefore, these currents will not be capable of producing any magnetization at such intersection points. As a result, the region over which the magnetic storage medium extends need not necessarily be limited to the individual web portions, but may extend over the entire matrix, if this is technologically advantageous or desirable, without causing any inadmissible disturbances or couplings to occur between neighboring magnetic information storage regions.

Each of the above-mentioned magnetic storage regions extends around a respective one of the web portions 3, i.e., between two diagonally adjacent apertures 2.

Figure 1C:
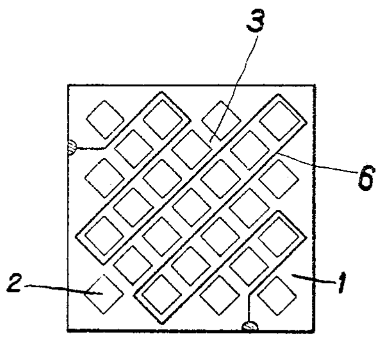
Figure 1D:
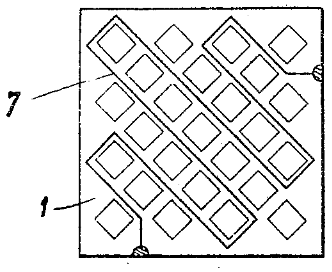

The second sheet of the matrix, which is shown in FIGURES 1*c* and 1*d*, also originally includes a polyester layer 1 and two copper layers each disposed on a respective surface of the polyester layer. Portions of the upper copper layer are selectively removed together with portions of layer 1, to form apertures 2 and a first reading circuit half 6 and portions of the bottom copper layer are similarly selectively removed to form a second reading circuit half 7, the two circuit halves being subsequently connected together in series by means of an external connection. As is the case of FIGURES 1*a* and 1*b*, the views of FIGURES 1*c* and 1*d* are taken in the same direction in order to facilitate an understanding of the relation between the two reading circuit halves.

The reading circuit is arranged to traverse all of the web portions 3 in a manner which is analogous to that of the reading circuits employed in toroidal core storage matrices and in such a manner that it will substantially completely cancel the effects of unwanted "noise" outputs produced by the half-select currents.

Figure 1E:
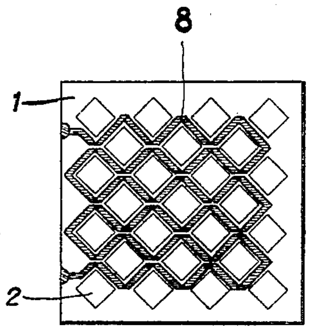

The third sheet, which is shown in FIGURE 1*e*, is composed of a polyester layer 1 and a single copper layer which is selectively etched away in the manner illustrated to form apertures 2 and the inhibit circuit 8 whose function is similar to that of the inhibit circuits employed in conventional toroidal core storage matrices.

The manufacture of a storage matrix having the components illustrated in FIGURE 1 may be carried out according to the following steps:

(1) Degreasing and de-oxidizing the exposed surfaces of the copper layers of each of the sheets.

(2) Coating each exposed copper surface with a light-sensitive, acid-resistant photographic lacquer, such as "Photolack" for example.

(3) Applying a photomask to each copper surface for producing the apertures 2, and exposing each copper surface to light.

(4) Developing and etching away the copper layer at the locations which have been exposed to light.

(5) Dissolving away, by the application of concentrated hot sulfuric acid, the polyester layer portions which have been exposed by the etching of the copper coating.

(6) Again coating the surface of each copper layer with photographic lacquer, applying a photomask on each surface for producing the desired conductor circuit configuration, exposing each masked surface to light, and developing and etching away the portions of each copper layer which have been exposed to light to produce the desired conductor circuits.

(7) Insulating the resulting conductor circuits with lacquer or insulating foils.

(8) Aligning and cementing together the resulting sheets.

(9) Chemically silver plating all of the exposed surfaces of the resulting matrix.

(10) Electrolytically applying the storage medium in the form of a layer, which may be composed, for example, of an alloy of 81% nickel and the remainder iron applied so as to have a thickness of the order of $1\mu$, while simultaneously passing current through one or more of the electrical conductors for the purpose of creating a magnetic anisotropy. The magnetic storage layer may also be applied by evaporation in a vacuum.

(11) In those cases where the magnetic storage layer should be disposed only in the information storage areas, which are also known as functional areas, the undesired portions of the storage layer may be subsequently removed by a photographic etching process.

(12) Additionally coating the completed matrix with a suitable lacquer to provide a protection against corrosion and mechanical damage.

It should be appreciated that a storage matrix fabricated in the above-described manner represents only one example of the practice of the present invention. The present invention may also be employed for the fabrication of storage devices for other purposes, such as for word-organized storage devices and for switching and logical systems, for example.

It is also possible to vary the shape of each individual function area, which may be constituted by a storage, switching, or logical element, in order to adapt it to a particular intended purpose. It is additionally possible to vary the dimensions, the path configuration, and the relative positions of the plurality of conductors as required by a particular situation.

If, for example, it is required to maintain the switching current at as low a level as possible, this can be readily accomplished simply by making both the web portions 3 and the conductor circuits as narrow as possible, within the limits of the photographic etching techniques employed and the required conductor resistances.

The length of each web portion 3 will determine both the extent of the required magnetization signals and the bit density of a matrix of given dimensions. In those situations where it is desired to maintain the capacitance between adjacent conductors at as low a level as possible, for example in the case of high speed storage devices, the conductor portions of one circuit may be disposed on their web portions so as to be laterally offset with respect to the conductor portions of at least one other circuit disposed on corresponding web portions of another supporting layer surface. Such a lateral offsetting may, for example, be by an amount which is substantially equal to the width of one of the conductor portions.

Figure 2:
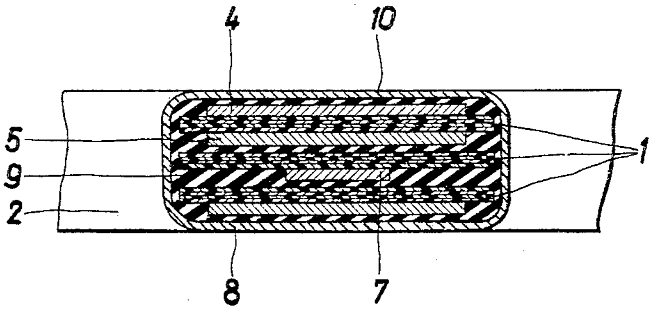

Referring now to FIGURE 2, there is shown a cross-sectional view of a portion of a matrix constructed from the elements shown in FIGURES 1 taken perpendicular to the length of one web portion 3. This figure shows the manner in which the various sheets are assembled to form the finished matrix. For purposes of clarity, the thickness dimensions of the various portions of the matrix have been greatly exaggerated.

The matrix is composed of a top polyester layer 1 carrying a series of line conductors 4 and column conductors 5, a second polyester layer 1 carrying the reading circuit 6, 7 (only 7 being visible), and a third polyester layer 1 carrying the inhibit circuit 8. These layers, with their associated circuits, are stacked on top of one another with their web portions 3 substantially in alignment and are cemented together and incapsulated by a mass of an insulating hardening lacquer 9. Each web portion is then covered by a magnetic information storage layer 10.

As may be seen from FIGURE 2, the portion of storage layer 10 defining each function area, i.e., the area surrounding each web portion 3 of the matrix, has a substantially cylindrical configuration, as is also the case for matrices produced according to the first-mentioned known manufacturing processes.

In matrices of this type, as in the case of matrices employing toroidal cores, the operation circuits are disposed substantially parallel to the cylindrical axis and act to magnetically polarize the magnetic storage layer in a generally circular direction perpendicular to the cylindrical axis. Under such conditions, it is only possible to rapidly effect a reversal of the magnetic field polarization through rotary processes by the application of fields whose value greatly exceeds the coercive field intensity of the magnetic storage layer, and hence by the application of high current levels. In such devices, as well as in all other conventional devices employing iron cores having large magnetic cross sections, it is not possible to produce a rotary magnetic reversal means of relatively weak fields combined with transversely-directed field impulses, although such a result can be achieved in devices whose magnetic storage elements are in the form of very thin layers which are magnetically isolated from one another.

Figure 3A:
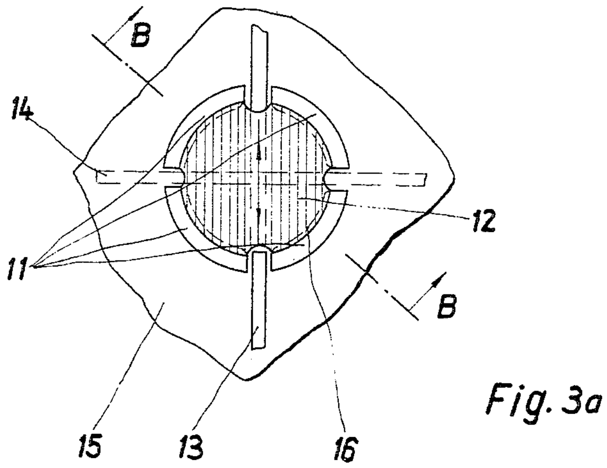
Figure 3B:
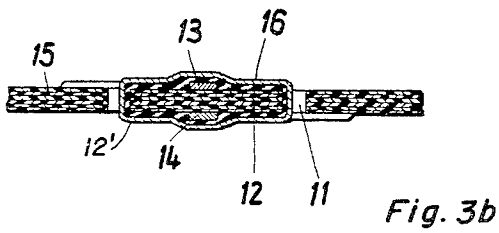

Referring now to FIGURES 3*a* and 3*b*, there is shown a portion of another arrangement fabricated according to the present invention which is capable of achieving a reversal of the direction of magnetization of the magnetic storage elements, even in the case where these elements are constituted by relatively thick layers, by means of rotary switching processes carried out with the aid of additional transversely-directed field pulses. This capability of effecting a rapid switching of the magnetic state of relatively thick magnetic storage layers, which does not require any increase in the amplitudes of the various circuit currents, yields obvious advantages even if the maximum switching times of, for example, $0.1/\mu$ sec. which can be achieved are still considerably longer than those which can be realized with very thin magnetic storage layers, these latter storage layers having a relatively poor energy storage capability.

FIGURE 3*a* is a plan view of one storage element of a matrix having the above capability. FIGURE 3*b* is a cross-sectional view taken along the plane defined by the line B—B of FIGURE 3*a*. In FIGURE 3*a*, the functional area, or magnetic storage area 12, which is denoted by parallel lines, has a circular configuration and is bounded by arcuate apertures 11 through which the magnetic storage layer 16 passes. Area 12 is connected to supporting sheet 15 only by means of four narrow connecting webs over which pass the line and column conductors 13 and 14.

Conductors 13 and 14 pass through the function area at right angles to one another and the magnetic storage layer 16 is fabricated in such a manner that its preferred direction of magnetization is parallel to conductor 13, as is indicated by the double headed arrow in FIGURE 3*a*.

The magnetic storage layer 16 thus has substantially the form of a disc-shaped box having four openings in its lateral wall for the passage of the line and column conductors.

When the storage layer 16 has the form shown in FIGURE 3, and when the line and column conductors are disposed with respect to one another as illustrated, it is possible to cause the flux stored in the magnetic storage layer to be rotated about the axis of the box defined by the layer 16 to any desired angular position with respect to the preferred direction of magnetization, even if the layer 16 is relatively thick, merely by controlling the relative amplitudes of the currents carried by the conductors 13 and 14. Moreover, this result can be achieved without creating an effective resistance due to the presence of the magnetizing fields. It is therefore possible to switch the storage flux very rapidly, in a manner similar to that achieved with magnetically isolated thin storage layers, with the aid of an additional field pulse oriented transversely to the preferred direction of magnetization and through the use of relatively weak longitudinal fields. It is also possible to reversibly rotate the direction of storage flux through small angles, so as to carry out a non-destructive bipolar selection for example.

The preferred direction of magnetization of the storage layer 16 can also be given any desired angular position merely by passing suitable auxiliary currents through the conductors 13 and 14 at the time of the application of layer 16 so as to permit a subsequent rotary magnetization of the storage layer to be effected merely by passing a current through one of the two conductors.

Figure 4:
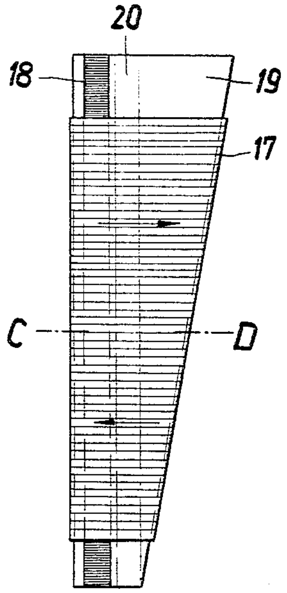
FIGURE 4 is a plan view of another device according to the present invention.

Referring now to FIGURE 4, there is shown one embodiment of a magnetic logic system which can be constructed in accordance with the present invention. This device also constitutes a novel structure for storing and metering pulse sequences.

The device is essentially characterized in that the magnetic storage layer 17, which is denoted by horizontal hatching lines, has the form of a laterally flattened truncated cone with the surfaces parallel to the plane of the figure being disposed parallel to one another. Extending through the region enclosed by layer 17 is a conductor 18 connected to carry the pulses to be metered or stored. Conductor 18 is carried on one surface of a carrier layer 19 which also carries, on its other surface, a reading conductor 20.

When the storage layer 17 is in a state where it supports a certain amount of residual rotary magnetism, this magnetism will exhibit a reversal of direction at some point between its apex, or lower end, and its base, or upper end, when an inversion current is passed along conductor 18, this reversal existing at the magnetic reversal front C–D (180° wall). If voltage pulses are then applied to the conductor 18, each pulse will cause this magnetic reversal front to be displaced along the length of the layer 17 by a distance which is proportional to the time integral of the voltage pulse and inversely proportional to the product of the thickness of the layer 17 and its saturation magnetization. It is thus possible to consider the position of the magnetic reversal front as a representation of the time integral either of a series of voltage pulses having the same amplitude or of a continuous time-varying voltage. The value of this integral can then be determined simply by interrogating the unit with a series of remagnetization pulses of known amplitude, the output appearing on reading conductor 20.

Figure 5:
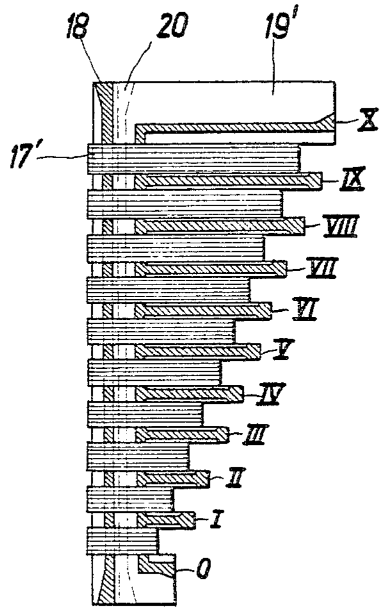
FIGURE 5 is a top plan view of a modified form of the device of FIGURE 4.

Referring now to FIGURE 5, there is shown another embodiment of an arrangement of this type in which the function area is subdivided into a plurality of individual bands 17′ having progressively increasing circumferential dimensions. These bands can be interrogated either in series, in parallel, or individually and repeatedly by means of the separately existing conductors 0, I, II, III, IV, V, VI, VII, VIII, IX, and X, and reading conductor 20. This arrangement may also be used as a pulse distributor for the generation of pulses which arise as a result of a time delay at a number of the outputs. In this case, the input conductor 18 is supplied with a regular sequence of voltage pulses each of which alters the polarity of a successive ones of the bands 17′. After all of the bands have been subjected to such a polarity reversal, they are all returned to their original state by the application of a sufficiently strong resetting pulse.

It will be understood that the above description of the present invention is susceptible to various modifications, changes, and adaptations.

What is claimed is:

1. A device for the storing, switching, or logic combination of data, comprising, in combination:

(a) a flat support layer having a plurality of apertures each having substantially the form of a circular arc, said apertures being disposed in groups of four, each group having a common center of curvature and delimiting a substantially circular functional area for storing information, the apertures of each said group being separated from one another by web portions of the support layer material, each said functional area thus having four associated web portions connecting it with the remainder of said support layer and distributed equiangularly thereabout;

(b) two insulated selection conductor circuits disposed on said layer and each having a respective conductor portion traversing each said functional area, the conductor portions associated with each said area extending at right angles to one another within said area and being carried by respective diametrically opposed pairs of the web portions associated with said area; and (c) a thin, substantially closed magnetic information storage layer enclosing each said functional area and the conductor portions within the boundary of said area.

2. An arrangement as defined in claim 1 wherein said storage layer has the form of a hollow circular cylinder having openings only for the passage of the web portions of its associated functional area, said storage layer being magnetizable in any angular direction about the axis of said functional area in accordance with the relation between the currents carried by said two selection circuits.

3. An arrangement as defined in claim 2 wherein said storage layer has a magnetic anisotropy with respect to the directions in which said conductor portions of its associated functional area extend.

4. An arrangement as defined in claim 3 wherein the anisotropy of said storage layer is in a preferred direction of easy magnetization, parallel to the plane of said support layer, which anisotropy is created by the passage of predetermined currents through said conductor circuits during the formation of said storage layer, and wherein current pulses applied to said conductor circuits produce magnetic pulses which create a magnetic field that is angularly offset with respect to such preferred direction and which change the direction of magnetization of said storage layer.

5. An arrangement as defined in claim 4 wherein such magnetic pulses act to rotate the direction of magnetization of said storage layer.

6. A method of fabricating a device for the storing, switching, or logic combination of data using thin magnetic layers located at predetermined functional areas and capable of storage, and electric functional circuits for controlling and monitoring the magnetization direction of such layers, comprising the steps of:

(a) perforating a flat support layer having a layer of electrically conductive material on each surface thereof with a plurality of spaced apertures each having substantially the form of a circular arc, said apertures being disposed in groups of four, each group having a common center of curvature and delimiting a substantially circular functional area for storing information, the spacing between the apertures of each said group defining web portions connecting said functional area with the remainder of said support layer and disposed equiangularly about said functional area;

(b) selectively etching away portions of said conductive material layers to form two functional circuits each having a conductor portion traversing each said functional area, the two conductor portions thus associated with each said functional area extending at right angles to one another within said area and being carried by respective diametrically opposed pairs of the web portions associated with said area;

(c) electrically insulating each functional circuit; and (d) depositing a thin, substantially closed magnetic information storage layer having the form of a hollow circular box around each functional area while passing currents through such functional circuits to create a magnetic field at each functional layer which imparts to its associated storage layer a magnetic anisotropy in a preferred direction of easy magnetization parallel to the plane of said support layer.

7. A method as defined in claim 6 wherein said step of depositing a storage layer is carried out by electrochemically depositing a layer of magnetic material around each functional area.

8. A method as defined in claim 6 wherein said step of depositing a storage layer is carried out by a vapor deposition process.

9. A method of fabricating a device for the storing, switching, or logic combination of data using thin magnetic layers located at predetermined functional areas and capable of storage, and electric functional circuits for controlling and monitoring the magnetization direction of such layers, comprising the steps of:

(a) perforating a flat support layer of plastic material having a copper layer on each surface thereof with a plurality of spaced apertures, each having substantially the form of a circular arc, by photochemically etching away portions of the copper layer and etching away corresponding portions of the support layer, said apertures being disposed in groups of four, each group having a common center of curvature and delimiting a substantially circular functional area for storing information, the spaces between the apertures of each said group defining web portions connecting said functional area with the remainder of said support layer and disposed equiangularly about said functional area;

(b) selectively etching away portions of said conductive material layers to form two functional circuits each having a conductor portion traversing each said functional area, the two conductor portions thus associated with each said functional area extending at right angles to one another within said area and being carried by respective diametrically opposed pairs of the web portions associated with said area;

(c) electrically insulating each functional circuit; and (d) depositing a thin, substantially closed magnetic information storage layer having the form of a hollow circular box around each functional area.

References Cited

UNITED STATES PATENTS

| | | | |
|---|---|---|---|
| 3,206,732 | 9/1965 | Briggs | 340—174 |
| 3,140,471 | 7/1964 | Fuller | 340—174 |
| 3,212,070 | 10/1965 | Fuller et al. | 340—174 |
| 3,293,623 | 12/1966 | Bobeck | 340—174 |
| 3,305,845 | 2/1967 | Grace et al. | 340—174 |
| 3,395,403 | 7/1968 | Wu | 340—174 |
| 3,142,047 | 7/1964 | Henderson | 340—174 |

STANLEY M. URYNOWICZ, Jr., Primary Examiner